(12) United States Patent  (10) Patent No.: US 7,959,075 B2
Higashiura et al.  (45) Date of Patent: Jun. 14, 2011

(54) FRAUD REGISTRATION PREVENTING APPARATUS, FRAUD REGISTRATION PREVENTING METHOD, COMPUTER-READABLE RECORDING MEDIUM IN WHICH FRAUD REGISTRATION PREVENTING PROGRAM IS STORED, AND FRAUD REGISTRATION PREVENTING SYSTEM

(75) Inventors: Yasuyuki Higashiura, Inagi (JP); Takumi Kishino, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 389 days.

(21) Appl. No.: 11/709,020

(22) Filed: Feb. 22, 2007

(65) Prior Publication Data

US 2008/0041939 A1   Feb. 21, 2008

(30) Foreign Application Priority Data

Aug. 21, 2006  (JP) ................................. 2006-224399

(51) Int. Cl.
    *G06K 5/00*  (2006.01)
(52) U.S. Cl. ....................... 235/380; 713/186
(58) Field of Classification Search .................. 235/380, 235/382.5; 713/188
    See application file for complete search history.

(56) References Cited

U.S. PATENT DOCUMENTS

| 7,185,808 | B2 * | 3/2007 | Mitsumoto | 235/382.5 |
|---|---|---|---|---|
| 2004/0021552 | A1 * | 2/2004 | Koo | 340/5.53 |
| 2004/0230809 | A1 * | 11/2004 | Lowensohn et al. | 713/186 |
| 2005/0086497 | A1 * | 4/2005 | Nakayama | 713/185 |
| 2006/0018523 | A1 * | 1/2006 | Saitoh et al. | 382/124 |
| 2006/0143471 | A1 * | 6/2006 | Igarashi | 713/186 |
| 2007/0061590 | A1 * | 3/2007 | Boye et al. | 713/186 |
| 2007/0291996 | A1 * | 12/2007 | Hoffman et al. | 382/115 |
| 2008/0147481 | A1 * | 6/2008 | Robinson et al. | 705/10 |

FOREIGN PATENT DOCUMENTS

| JP | 2001-118066 A | 4/2001 |
|---|---|---|
| JP | 2002-342289 A | 11/2002 |
| JP | 2006-178897 A | 7/2006 |

* cited by examiner

*Primary Examiner* — Seung H Lee
*Assistant Examiner* — Sonji Johnson
(74) *Attorney, Agent, or Firm* — Westerman, Hattori, Daniels & Adrian, LLP

(57) ABSTRACT

A fraud registration preventing apparatus according to the present invention comprises a registrant information obtaining section obtaining registrant information of a registrant, an operator information obtaining section obtaining operator information concerning an operator who carries out a registration operation of the registrant information obtained by the registrant information obtaining section, a collating section collating the registrant information obtained by the registrant information obtaining section and the operator information obtained by the operator information obtaining section, and a registration prohibiting section prohibiting registration of the registrant information when a collation result of the collating section shows coincidence or almost coincidence. With this, when a registration operation is carried out with respect to a user authentication system, it is possible to prevent the fraud registration by the operator.

11 Claims, 6 Drawing Sheets

FRAUD REGISTRATION PREVENTING APPARATUS, FRAUD REGISTRATION PREVENTING METHOD, COMPUTER-READABLE RECORDING MEDIUM IN WHICH FRAUD REGISTRATION PREVENTING PROGRAM IS STORED, AND FRAUD REGISTRATION PREVENTING SYSTEM

BACKGROUND OF THE INVENTION

1) Field of the Invention

The present invention relates to a technique for preventing fraud registration when, for example, biological information is to be registered with respect to a user authentication system in a banking institution.

2) Description of the Related Art

In recent years, in a banking institution and the like, user authentication systems for authenticating users using biological information become widespread as shown in Japanese Patent Applications Laid-Open No 2001-118066 and 2002-342289 for example. Examples of the biological information are fingerprint, palm print, finger shape, palm shape, voice, retina, iris, face image, dynamic signature, blood vessel pattern, and key stroke.

According to such a user authentication system, an operator operates a processing terminal in an office such as a branch office of a banking institution, and biological information of a customer (registrant) is registered. One example of procedure of the operator to register the biological information of the customer in the user authentication system will be explained.

First, if a customer comes to the office and opens a new account, an operator of the office carries out registration of card application using the processing terminal. At the time of this card application registration, the operator authenticates the customer by his or her identification card or the like, inputs customer information which is necessary for opening the account or applying the card into the processing terminal, and the input information is sent to a management center which collectively manages the customer information of each office. Prior to the operation of the processing terminal, the operator logs in to the processing terminal using an operator card or the like.

In the management center, the customer information which was input by the processing terminal is registered in a database, a request for issuing an IC card is sent, together with a portion of the customer information, to a card issuing center which issues the customer card (IC card). In the card issuing center, customer information such as account information is written in the customer card, and the customer card in which the customer information is written is directly sent to the customer from the card issuing center.

The biological information is not registered in the customer card sent from the card issuing center. If the customer card needs to be used for biological authentication, the customer needs to bring the customer card to the office again and to register the biological information of the customer.

The customer who brought the customer card shows his or her IC card to the operator, and the operator sees the IC card and inputs biological information using an input device of the office. The operator carries out the registration operation using the biological information which is input to the input device, the biological information of the customer is registered in the customer card and the management center, and the biological information of the customer can be used for user authentication.

When the biological information of the customer is registered in the customer card or the management center in accordance with the above-described procedure, it is possible to register the biological information in a fraud manner by the operator's operation. For example, the operator can hand over an off-line input device to the customer, and can input the operator's own biological information to the input device which is on-line connected, or the operator obtains, in some way, a card of the customer in which biological information is not yet registered and carries out the registration operation of the operator's own biological information in the obtained customer card, and the operator can register his or her own biological information in the customer card, or a person who can control the system like the operator can register the biological information of his or her own instead of biological information of the customer in the fraud manner.

There is a problem that the customer card which is registered in the fraud manner can be authenticated using the biological information of the operator, and the operator who registered in the fraud manner can use the customer card in the fraud manner.

SUMMARY OF THE INVENTION

The present invention has been accomplished in view of such a problem, and it is an object of the invention to prevent the fraud registration by an operator when a registration operation is to be carried out with respect to a user authentication system.

To achieve the above object, the present invention provides a fraud registration preventing apparatus comprising a registrant information obtaining section obtaining registrant information of a registrant, an operator information obtaining section obtaining operator information concerning an operator who carries out a registration operation of the registrant information obtained by the registrant information obtaining section, a collating section collating the registrant information obtained by the registrant information obtaining section and the operator information obtained by the operator information obtaining section, and a registration prohibiting section prohibiting registration of the registrant information when a collation result of the collating section shows coincidence or almost coincidence.

It is preferable that the registrant information and the operator information are biological information.

It is preferable that the operator information obtaining section includes an operator ID obtaining section obtaining operator identifying information of the operator, and an operator information extracting section extracting the operator information based on the operator identifying information, the collating section collates the registrant information obtained by the registrant information obtaining section and the operator information extracted by the operator information extracting section.

The fraud registration preventing apparatus may further comprise a notifying section notifying the collation result when the collation result of the collating section shows coincidence or almost coincidence.

Further, the invention provides a fraud registration preventing method comprising a registrant information obtaining step of obtaining registrant information of a registrant, an operator information obtaining step of obtaining operator information concerning an operator who carries out a registration operation of the registrant information obtained at the registrant information obtaining step, a collating step of collating the registrant information obtained by the registrant information obtaining step and the operator information obtained at the operator information obtaining step, and a registration prohibiting step of prohibiting registration of the registrant information when a collation result of the collating step shows coincidence or almost coincidence.

It is preferable that the registrant information and the operator information are biological information.

It is preferable that the operator information obtaining step includes an operator ID obtaining step of obtaining operator identifying information of the operator, and an operator information extracting step of extracting the operator information based on the operator identifying information, and the collating step collates the registrant information obtained at the registrant information obtaining step and the operator information extracted at the operator information extracting step.

The fraud registration preventing method may further comprise a notifying step of notifying the collation result when the collation result of the collating step shows coincidence or almost coincidence.

Further, the invention provides a computer-readable recording medium in which a fraud registration preventing program is stored, wherein the program makes a computer function as a registrant information obtaining section obtaining registrant information of a registrant, an operator information obtaining section obtaining operator information concerning an operator who carries out a registration operation of the registrant information obtained by the registrant information obtaining section, a collating section collating the registrant information obtained by the registrant information obtaining section and the operator information obtained by the operator information obtaining section, and a registration prohibiting section prohibiting registration of the registrant information when a collation result of the collating section shows coincidence or almost coincidence.

It is preferable that the registrant information and the operator information are biological information.

It is preferable that when the program makes the computer function as the operator information obtaining section, the computer is made to function as an operator ID obtaining section obtaining operator identifying information of the operator, and an operator information extracting section extracting the operator information based on the operator identifying information, and when the program makes the computer function as the collating section, the computer is made to function so as to collate the registrant information obtained by the registrant information obtaining section and the operator information extracted by the operator information extracting section.

The computer may be made to function as a notifying section notifying the collation result when the collation result of the collating section shows coincidence or almost coincidence.

Further, the invention provides a fraud registration preventing system comprising a registrant information obtaining section obtaining registrant information of a registrant, a registration section in which the registrant information obtained by the registrant information obtaining section, an operator information obtaining section obtaining operator information concerning an operator who carries out a registration operation of the registrant information obtained by the registrant information obtaining section with respect to the registration section, a collating section for collating the registrant information obtained by the registrant information obtaining section and the operator information obtained by the operator information obtaining section, and a registration prohibiting section prohibiting registration of the registrant information to the registration section when a collation result of the collating section shows coincidence or almost coincidence.

It is preferable that the registrant information and the operator information are biological information.

It is preferable that the fraud registration preventing system further comprises an operator information storage section for storing the operator information, wherein the operator information obtaining section includes an operator ID obtaining section obtaining operator identifying information of the operator and an operator information extracting section extracting the operator information from the operator information storage section based on the operator identifying information, the collating section collates the registrant information obtained by the registrant information obtaining section and the operator information extracted by the operator information extracting section.

The fraud registration preventing system may further comprise a notifying section notifying the collation result when the collation result of the collating section shows coincidence or almost coincidence.

According to the present invention, as a collation result, if the input registrant information and operator information concerning the operator who carries out the registration operation match with each other or substantially match with each other, registration of the registrant information is prohibited. Therefore, even if the operator hands over an off-line input device to the registrant, and inputs the operator's own biological information to the input device which is on-line connected, or even when the operator obtains, in some way, a card of the customer in which biological information is not yet registered and carries out the registration operation of the operator's own biological information in the obtained customer card, the operator's own biological information cannot be registered in the card of the registrant, and when the registration operation is to be carried out with respect to the user authentication system, it is possible to prevent the fraud registration by the operator.

Further, by using the biological information as the registrant information and the operator information, it is possible to precisely identify the registrant and the operator, and to reliably specify the operator who carried out the fraud registration operation.

Further, the operator identifying information of the operator is obtained and the operator information is extracted based on the operator identifying information. Therefore, when the operator carries out the registration operation, it is unnecessary to input the operator information. Thus, the procedure of the operator at the time of the registration operation can be simplified.

When the collation results match with each other or substantially match with each other, the manager is informed of the collation result. Therefore, when the fraud registration is carried out by the operator, the manager who manages the entire system can easily know this fact.

DESCRIPTION OF THE PREFERRED EMBODIMENTS

Embodiments of the present invention will be explained with reference to the drawings.

[1] Explanation of an Embodiment of the Present Invention

Figure 1:
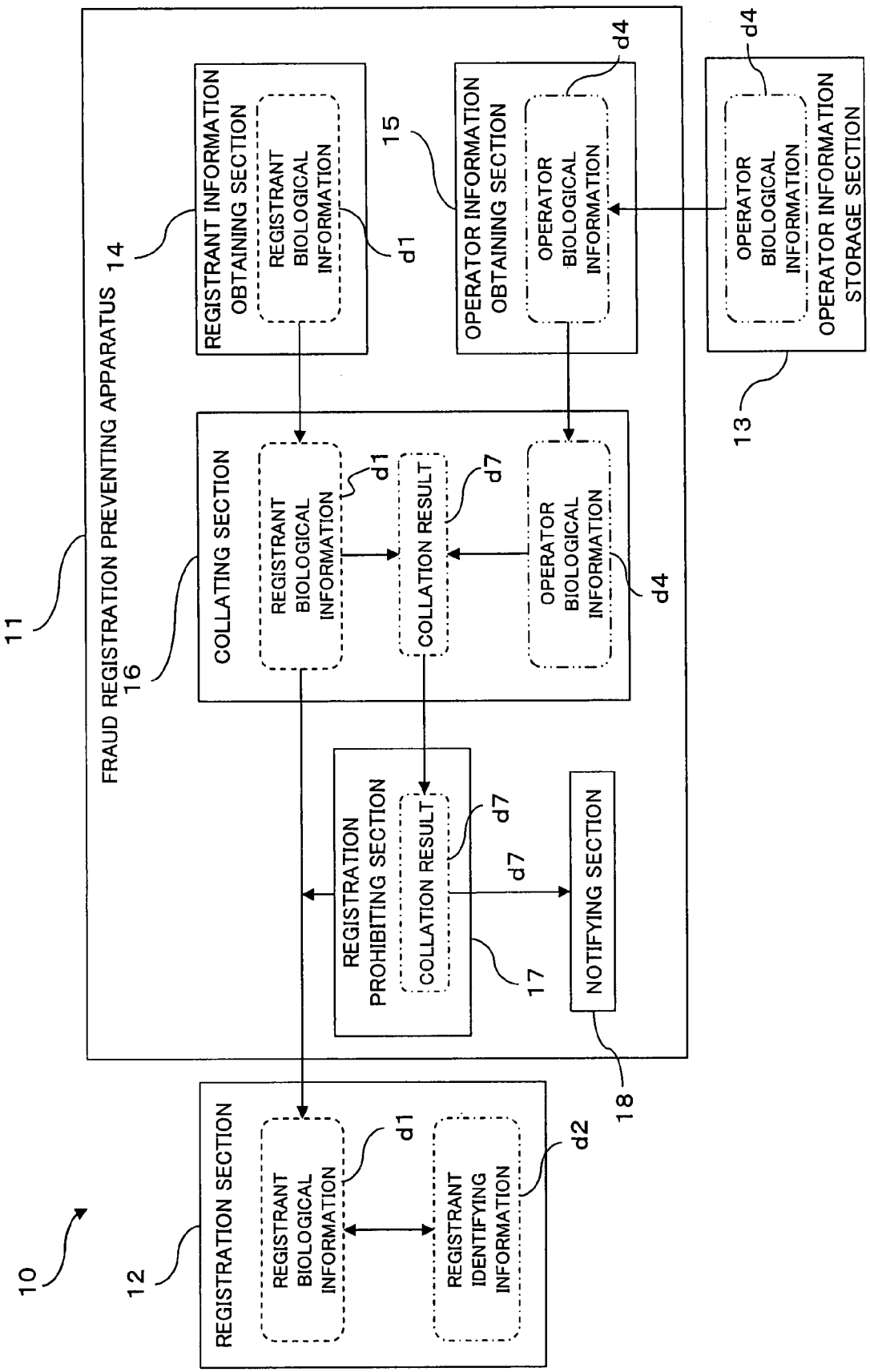
FIG. 1 is a block diagram showing a structure of a fraud registration preventing system according to an embodiment of the present invention.
Figure 2:
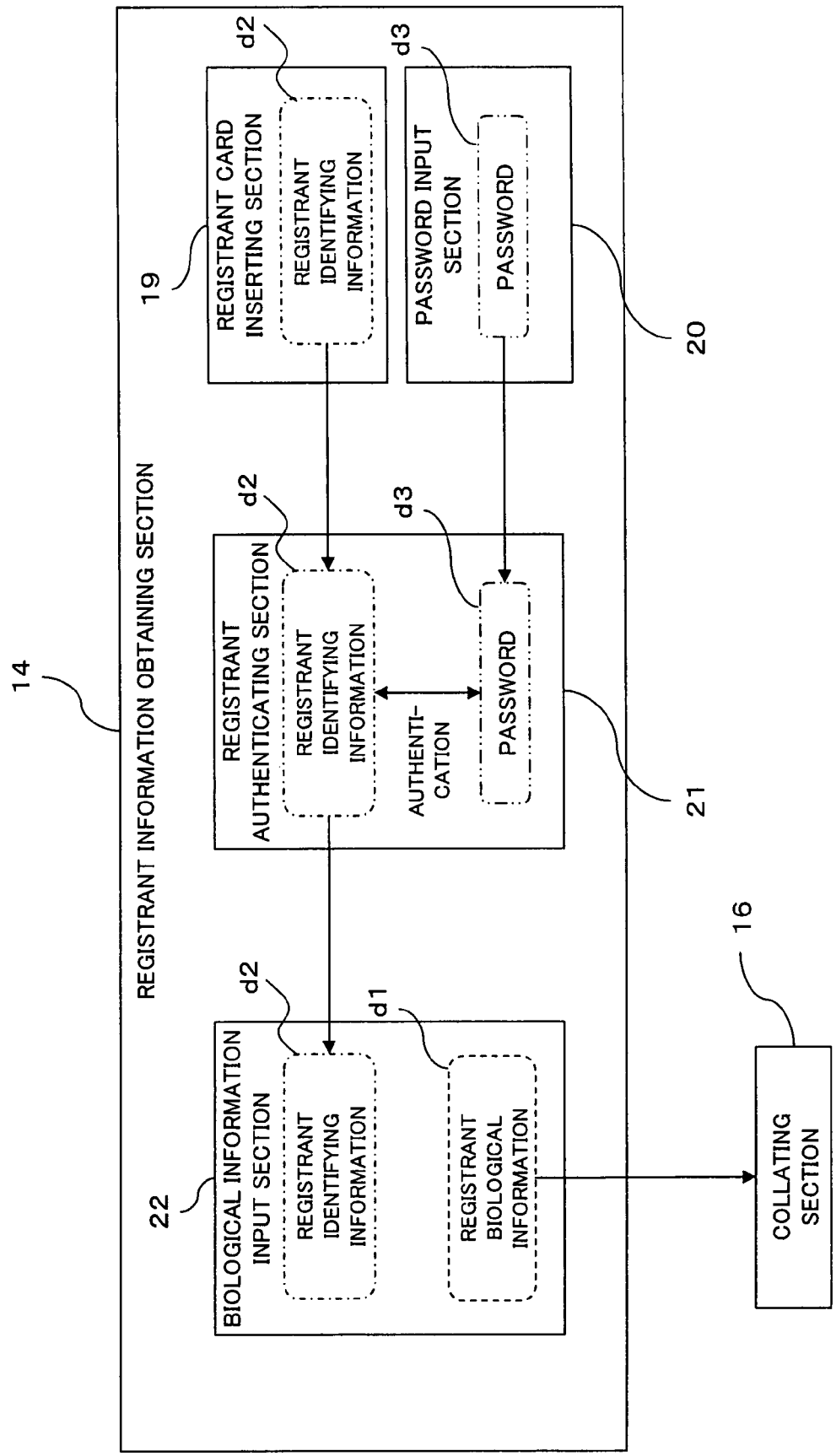
FIG. 2 is a block diagram showing a structure of a registrant information obtaining section of the fraud registration preventing system of the embodiment of the invention.
Figure 3:
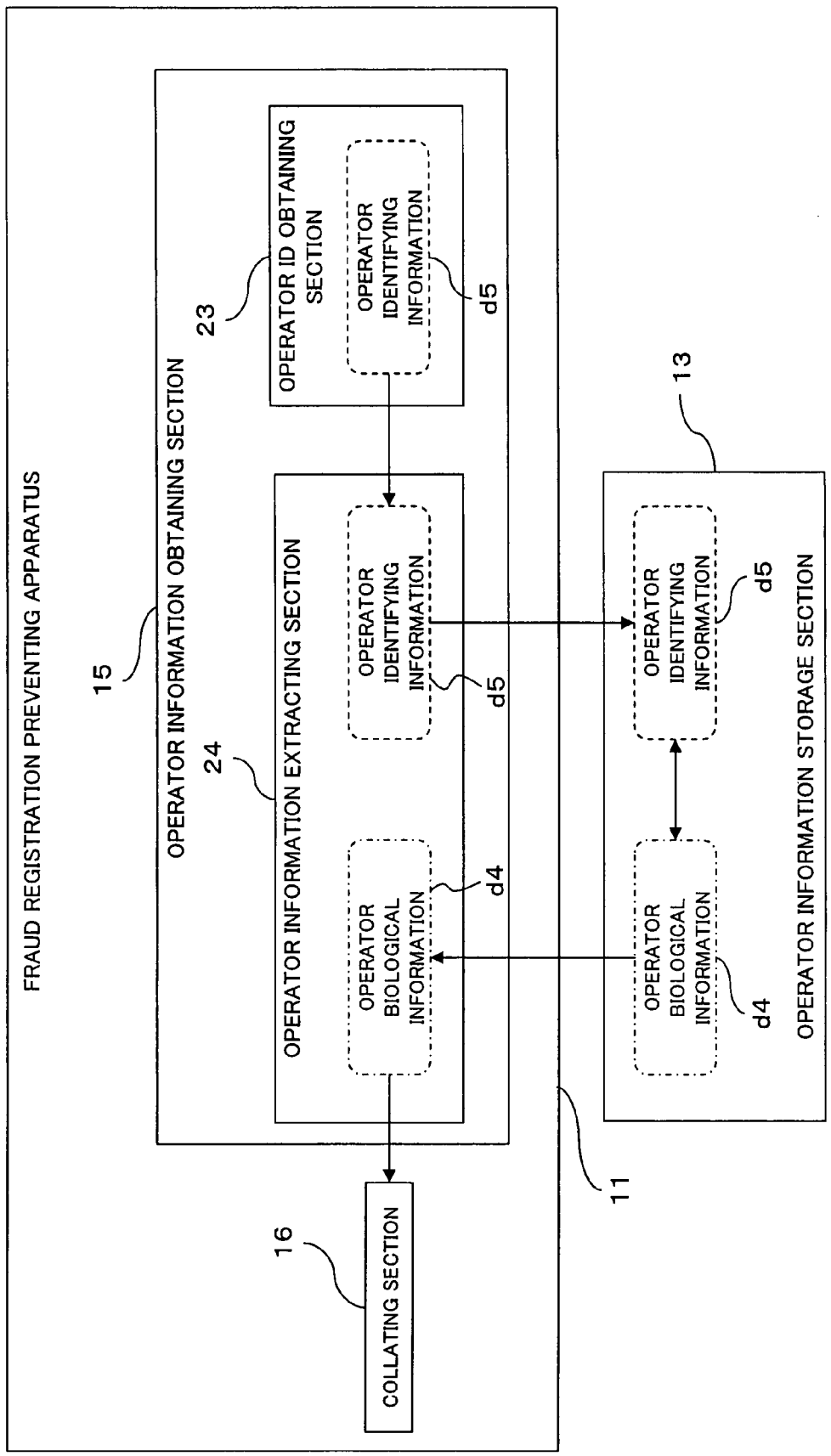
FIG. 3 is a block diagram showing a structure of an operator information obtaining section of the fraud registration preventing system of the embodiment of the invention.
Figure 4:
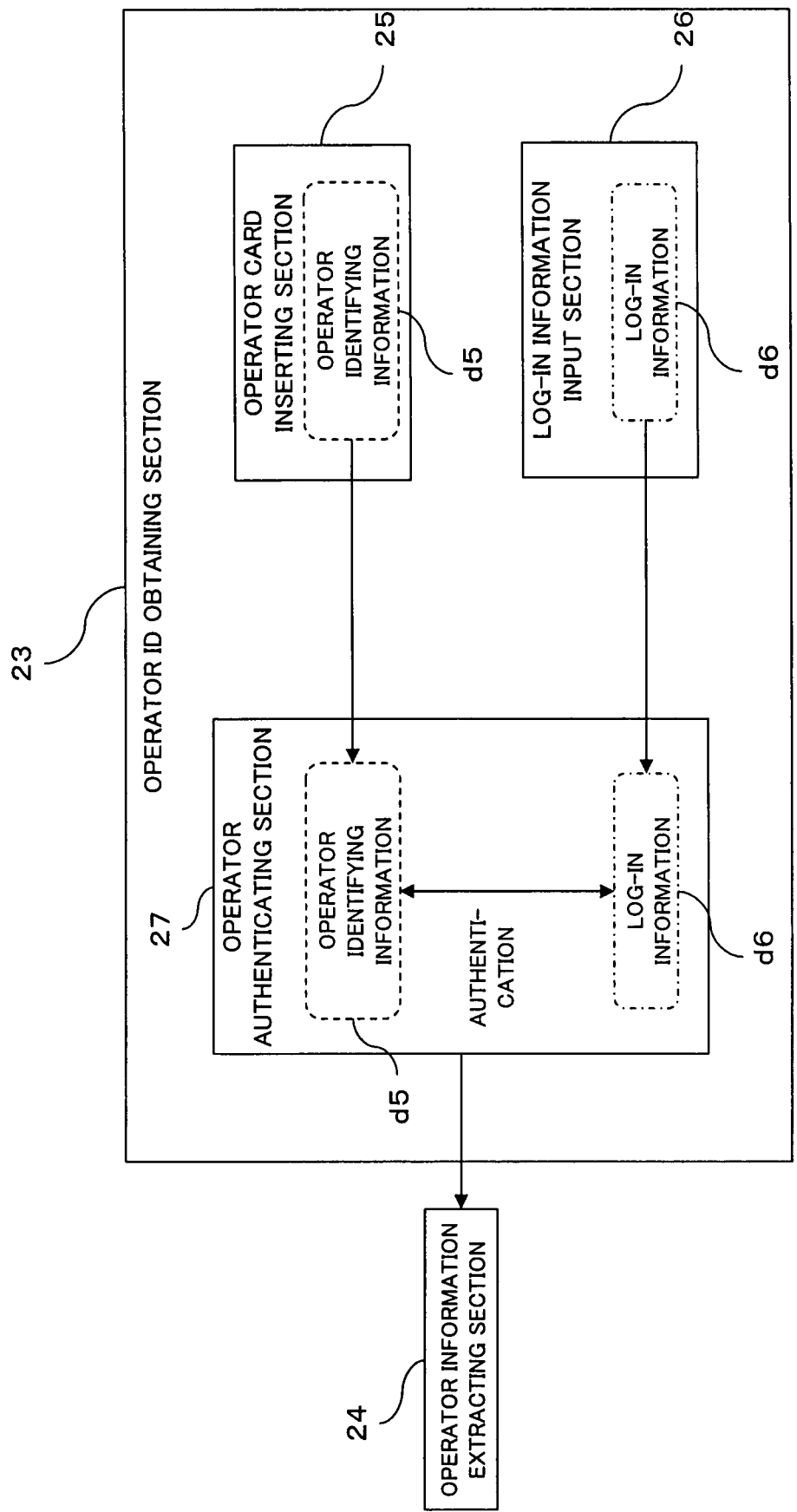
FIG. 4 is a block diagram showing a structure of a operator ID obtaining section of the fraud registration preventing system of the embodiment of the invention.

FIG. 1 is a block diagram showing a structure of a fraud registration preventing system of an embodiment of the invention. FIG. 2 is a block diagram showing an example of a structure of a registrant information obtaining section thereof. FIG. 3 is a block diagram showing an example of a structure of an operator information obtaining section thereof. FIG. 4 is a block diagram showing a structure of an operator ID obtaining section thereof.

A fraud registration preventing system 10 of the embodiment is provided in a user authentication system of a banking institution to prevent fraud registration of biological information of a customer (registrant) by an operator with respect to the user authentication system. The fraud registration preventing system 10 is provided in an operator terminal device (not shown) used by the operator. As shown in FIG. 1, the fraud registration preventing system 10 includes a fraud registration preventing apparatus 11, a registration section 12 and an operator information storage section 13. The fraud registration preventing apparatus 11 includes a registrant information obtaining section 14, an operator information obtaining section 15, a collating section 16, a registration prohibiting section 17 and a notifying section 18.

The registrant information obtaining section 14 is for obtaining registrant biological information (registrant information) d1 of a registrant. As shown in FIG. 2, for example, the registrant information obtaining section 14 includes a registrant card inserting section 19, a password input section 20, a registrant authenticating section 21 and a biological information input section 22.

If a registrant card is inserted into the registrant card inserting section 19, the registrant card inserting section 19 reads information written (stored and saved) in the registrant card, and obtains registrant identifying information d2. The registrant identifying information d2 obtained by the registrant card inserting section 19 is sent to the later-described registrant authenticating section 21.

The password input section 20 is for inputting a password d3 which is preset by the registrant, and the password d3 which is input to the password input section 20 is sent to the later-described registrant authenticating section 21.

The registrant authenticating section 21 authenticates whether a registrant is a legitimate registrant based on the registrant identifying information d2 obtained by the registrant card inserting section 19 and the password d3 which was input to the password input section 20. For example, a registrant database (not shown) which is previously registered is referred to based on the registrant identifying information d2, a password (not shown) which is previously registered in association with the registrant identifying information d2 and the input password d3 are compared with each other, it is determined whether they match with each other, thereby carrying out the authentication. When it is found that the password is not proper in the registrant authenticating section 21, registration processing of the later-described registrant biological information d1 can not be carried out. If it is authenticated that the registrant is the legitimate registrant, the registrant identifying information d2 is sent to the later-described biological information input section 22.

The biological information input section 22 is for inputting the registrant biological information d1 of a registrant. In this embodiment, a vein pattern of a palm of a hand of the registrant is input (scanned) as the registrant biological information d1. The registrant biological information d1 which is input to the biological information input section 22 is associated with the registrant identifying information d2 which is authenticated by the registrant authenticating section 21, and is sent to the later-described collating section 16.

The operator information obtaining section 15 obtains operator biological information d4 (operator information) concerning the operator who carries out the registration operation of the registrant biological information d1 obtained by the registrant information obtaining section 14 with respect to the registration section 12. As shown in FIG. 3, the operator information obtaining section 15 includes an operator ID (Identification) obtaining section 23 and an operator information extracting section 24. As the operator biological information d4 in this embodiment, a vein-pattern of a hand is used like the registrant biological information d1.

The operator ID obtaining section 23 is for obtaining operator identifying information d5 of an operator. As shown in FIG. 4, for example, the operator ID obtaining section 23 includes an operator card inserting section 25, a log-in information input section 26 and an operator authenticating section 27.

If the operator card of the operator is inserted into the operator card inserting section 25, the operator card inserting section 25 reads information written (stored and saved) in the operator card and obtains the operator identifying information d5. The operator identifying information d5 obtained by the operator card inserting section 25 is sent to the later-described operator authenticating section 27.

The log-in information input section 26 is for inputting log-in information d6 which is previously set for the operator. In this embodiment, a password (arbitrary character string) is used as the log-in information d6. The log-in information d6 which is input to the log-in information input section 26 is sent to the later-described operator authenticating section 27.

The operator authenticating section 27 authenticates that the operator is a legitimate operator based on the operator identifying information d5 obtained by the operator card inserting section 25 and the log-in information d6 which has been input into the log-in information input section 26. For example, an operator database (not shown) which is previously registered is referred to based on the operator identifying information d5, the log-in information d6 which has been input into the log-in information input section 26 and the log-in information (not shown) which is previously registered in association with the operator identifying information d5 are compared with each other and it is determined whether they match with each other, thereby authenticating the legitimate operator. If the operator is not authenticated by the operator authenticating section 27, the use of the operator terminal device is prohibited, and later-described registration processing of the registrant biological information d1 can not be carried out. If the operator authenticating section 27 authenticated the legitimate operator, the operator identifying information d5 is sent to the later-described operator information extracting section 24.

The operator information extracting section 24 extracts the operator biological information d4 based on the operator identifying information d5. More specifically, the operator information extracting section 24 extracts the operator biological information d4 which is associated with the operator identifying information d5 obtained by the operator ID obtaining section 23 from the later-described operator information storage section 13. The operator biological information d4 extracted by the operator information extracting section 24 is sent to the later-described collating section 16.

As shown in FIG. 1, the collating section 16 collates the registrant biological information d1 obtained by the registrant information obtaining section 14 and the operator biological information d4 obtained by the operator information obtaining section 15, and if a collation result d7 between the registrant biological information d1 and the operator biological information d4 shows coincidence or almost coincidence, the result becomes "NG", and otherwise "OK". The registrant biological information d1 and the collation result d7 are sent to the later-described registration prohibiting section 17.

When the collation result d7 by the collating section 16 shows coincidence or almost coincidence, i.e., when the result is "NG", the registration prohibiting section 17 prohibits the registration to the later-described registration section 12 of the registrant biological information d1. For example, when the registrant biological information d1 and the collation result d7 are obtained from the collating section 16 and the collation result d7 is "NG", the registration prohibiting section 17 holds the registrant biological information d1 without registering the same in the registration section 12, and sends the collation result d7 to the later-described notifying section 18. The registrant biological information d1 is held temporarily, and the registrant biological information d1 is erased by log-off operation for example. When the collation result d7 is "OK", the registrant biological information d1 is registered in the registration section 12.

When the collation result d7 by the collating section 16 shows coincidence or almost coincidence (when the collation result d7 is "NG"), the notifying section 18 notifies the collation result d7 to the outside sections of the fraud registration preventing apparatus 11.

As shown in FIG. 1, in the registration section 12, the registrant biological information (registrant information) d1 obtained by the registrant information obtaining section 14 is registered. The registration section 12 can communicate with the fraud registration preventing apparatus 11, the registrant biological information d1 is associated with the registrant identifying information d2 by the registration operation of the operator, and the user authentication of the registrant is carried out using the registrant biological information d1 stored in the registration section 12. The user authentication is carried out by the user authentication system (not shown). When an authenticated person does business, biological information (biological information of the authenticated person) is input in the user authentication system, the biological information of the authenticated person and the registrant biological information d1 stored in the registration section 12 are compared with and checked in the user authentication system, a coincidence ratio of these data sets is calculated, and if the coincidence ratio is equal to or higher than a predetermined value, the system determines that the authenticated person is a real registrant, and if the coincidence ratio is lower than the predetermined value, the system determines that the authenticated person is not a real registrant. As a result, the authenticated registrant can do business.

A plurality of registrant biological information sets d1 may be provided. That is, if the registrant biological information d1 is registered a plurality of times at the time of registration, the plurality of registrant biological information sets d1 having different positions, postures and the like can be registered. At the time of collation operation, the input biological information of an authenticated person and a plurality of registered registrant biological information sets d1 are sequentially compared with each other. With this, even when the position, the posture and the like are deviated when reading, the system determines that the registrant is a real registrant at the time of the collation operation. If vein patterns of left and right hand palms are separately registered as the registrant biological information d1, it is possible to authenticate a registrant using one of the registrant biological information sets d1. In this case, when one of the left and right hands (living bodies) is injured and can not be used, the other living body can be used for the collation operation.

As shown in FIGS. 1 and 3, the operator information storage section 13 stores the operator biological information d4 in association with the operator identifying information d5, and can communicate with the fraud registration preventing apparatus 11.

The registration procedure of the registrant biological information in the fraud registration preventing system 10 of the embodiment of the present invention having the above-described structure will be explained in accordance with the flowchart (steps S11 to S20) shown in FIG. 5.

The operator inserts an operator card into the operator card inserting section 25 (step S11), and inputs the log-in information d6 in the log-in information input section 26 (step S12). The operator authenticating section 27 authenticates whether the operator is a legitimate operator based on the operator identifying information d5 obtained by the operator card inserting section 25 and the log-in information d6 input in the log-in information input section 26.

If the operator authenticating section 27 authenticates the legitimate operator, the operator or the customer (registrant) inserts the registrant card into the registrant card inserting section 19 (step S13), and the customer inputs the password d3 in the password input section 20 (step S14). The registrant authenticating section 21 authenticates whether the registrant is the legitimate registrant based on the registrant identifying information d2 obtained by the registrant card inserting section 19 and the password d3 input in the password input section 20.

If the registrant authenticating section 21 does not authenticate (see NG route in step S14), it is determined that the registrant is not the legitimate registrant, the registration operation is not carried out (step S15), and the processing is completed.

If the registrant authenticating section 21 authenticates the registrant (see OK route in step S14), the registrant inputs the registrant biological information d1 in the biological information input section 22 (step S16).

The operator information extracting section 24 extracts, from the operator information storage section 13, the operator biological information d4 associated with the operator identifying information d5 obtained by the operator ID obtaining section 23 (step S17).

The collating section 16 collates the registrant biological information d1 obtained by the registrant information obtaining section 14 and the operator biological information d4 obtained by the operator information obtaining section 15 (step S18).

In the collating section 16, if the registrant biological information d1 and the operator biological information d4 prove coincident or substantially coincident with each other (see NG route in step S18) the collating section 16 inform the "NG" collation result d7 to the registration prohibiting section 17. The registration prohibiting section 17 informed of the "NG" collation result d7 determines that there is a possibility that an operator is operating in the fraud manner, and prohibits the registration section 12 to register the registrant biological information d1 (step S19), and the processing is completed.

When the registrant biological information d1 and the operator biological information d4 do not prove coincident with each other (see OK route in step S18), the collating section 16 notifies the "OK" collation result d7 to the registration prohibiting section 17. The registration prohibiting section 17 informed of the "OK" collation result d7 allows to register the registrant biological information d1 in the registration section 12, the registration section 12 registers the registrant biological information d1 (step S20), and the processing is completed.

As described above, according to the fraud registration preventing system 10 of the embodiment of the invention, if the collation result of the registrant biological information d1 and the operator biological information d4 shows coincidence or almost coincidence, the registration of the registrant biological information d1 is prohibited. Therefore, the fraud registration by the operator's operation can be prevented. Thus, even if the operator hands over an off-line input device to the registrant, and inputs the operator's own biological information to the input device which is on-line connected, or even when the operator obtains, in some way, a customer card in which registrant biological information d1 is not yet registered and carries out the registration operation of the operator biological information d4 in the customer card obtained by the operator, the operator biological information d4 of the operator of his or her own can not be registered in the customer card, and when the registration operation of the registrant biological information d1 is to be carried out, it is possible to prevent the fraud registration of the operator.

Further, the collating section 16 collates the registrant biological information d1 and the operator biological information d4 which was extracted by the operator information extracting section 24 based on the operator identifying information d5. That is, the collation is carried out in a one-to-one relationship. Therefore, it is possible to immediately determine whether the registration of the registrant biological information d1 in the registration section 12 should be prohibited.

Further, since the biological information is used as the registrant information and the operator information, it is possible to precisely distinguish a registrant and an operator from each other, and an operator who carried out a fraud registration operation can easily be specified.

Since the operator identifying information d5 of the operator is obtained and the operator biological information d4 is extracted based on the operator identifying information d5, it is unnecessary to input the operator biological information d4 when the operator carries out the registration operation. Therefore, the operator's procedure at the time of registration operation can be simplified.

When the collation result shows coincidence or almost coincidence, the manager who manages the entire system is informed of the collation result. Therefore, when a fraud registration is carried out by an operator, the manager can easily notice this fact.

When a plurality of registrant biological information sets d1 are registered, it is conceived that the fraud operator may secretly mix his or her biological information into the plurality of biological information sets of a legitimate registrant, and the fraud operator may register in the fraud manner. With such fraud registration, at the time of the collation operation, the fraud operator pretends as being an authenticated person and sequentially collates the input biological information of the authenticated person and the plurality of registered registrant biological information sets d1, it is determined that the biological information of the fraud operator which has been input by the fraud operator proves coincident with the fraud registrant biological information d1 which has been mixed in the registrant biological information d1 and registered in the fraud manner, and there is an adverse possibility that the fraud operator can register in the fraud manner without being noticed by a legitimate registrant. However, if the fraud registration preventing system 10 of the embodiment of the invention is used, since biological information of a fraud operator can not previously be registered as the registrant biological information d1, it is possible to prevent such a case.

[2] Others

The fraud registration preventing system 10 of the embodiment of the invention having the above-described structure includes the fraud registration preventing apparatus 11 connected to a network 42 and a managing server 28 connected to the fraud registration preventing apparatus 11 through the network 42.

Figure 6:
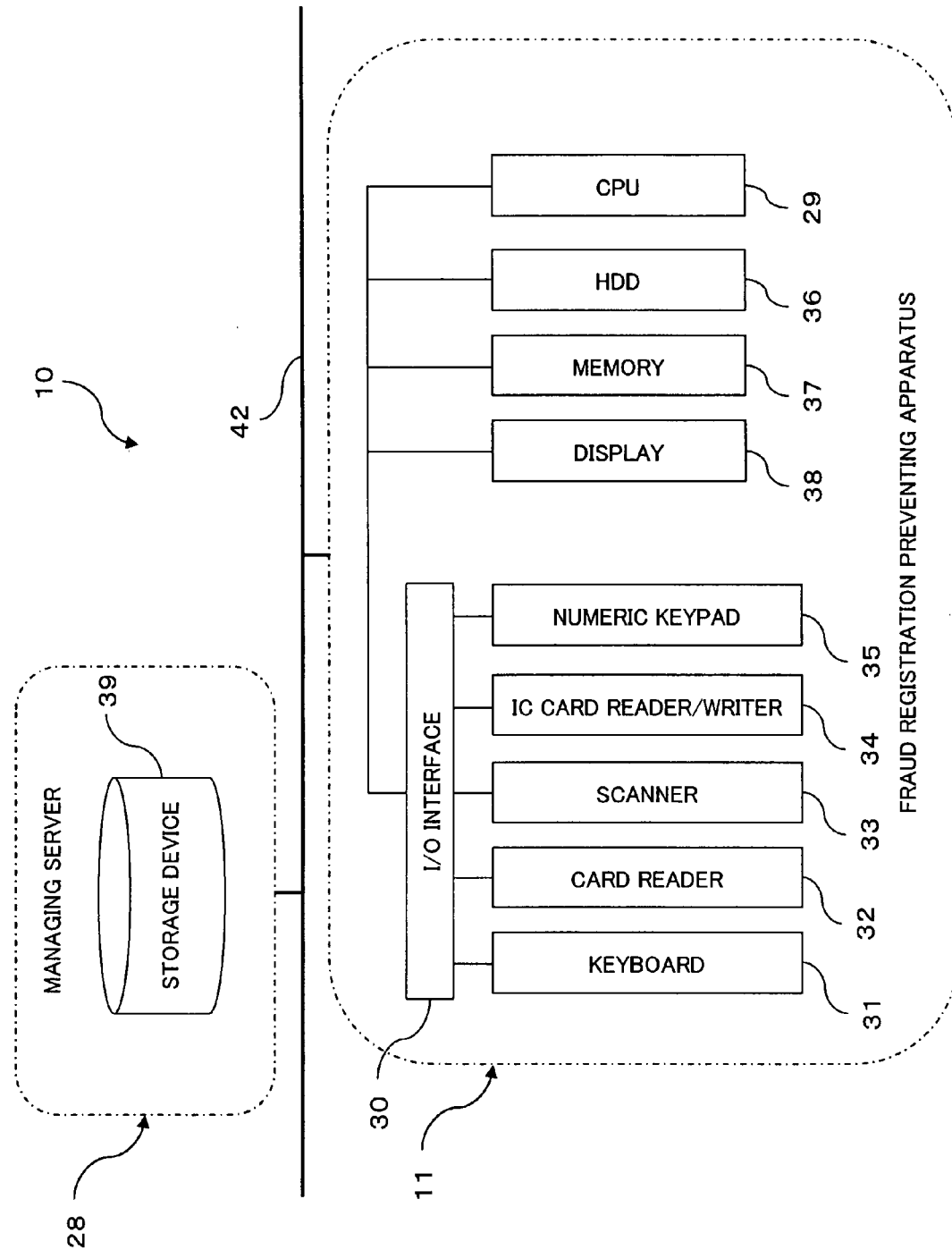
FIG. 6 is a schematic view of an example of a hardware structure of the fraud registration preventing system of the embodiment of the invention.

FIG. 6 schematically shows an example of a hardware structure of the fraud registration preventing system of the embodiment of the invention.

As shown in FIG. 6, the fraud registration preventing apparatus 11 is a computer including a CPU (Central Processing Unit) 29, an I/O (Input/Output) interface 30, a keyboard 31, a card reader 32, a scanner 33, an IC card reader/writer 34, a numeric keypad 35, a HDD (Hard Disk Drive) 36, a memory 37 and a display 38.

The CPU 29 calculates various numeric values, processes information and controls devices in the fraud registration preventing apparatus 11. The CPU 29 realizes functions as the collating section 16, the registration prohibiting section 17, the notifying section 18, the registrant authenticating section 21, the operator information extracting section 24 and the operator authenticating section 27.

The I/O interface 30 controls I/O devices. The later-described keyboard 31, card reader 32, scanner 33, IC card reader/writer 34 and numeric keypad 35 are connected to the I/O interface 30.

The keyboard 31 is used for inputting instruction contents of the operator, a password and the like. The keyboard 31 realizes a function of the log-in information input section 26. The operator uses the keyboard 31 and registers (registration operation) the registrant biological information d1 in the registration section 12.

The card reader 32 is for reading information written (stored and saved) in the operator card (not shown) of the operator. When a magnetic card is used as the operator card, if a magnetic card reader is used, it functions as the operator card inserting section 25.

The scanner 33 is for inputting biological information of a registrant. In this embodiment, a vein input device (not shown) for inputting (scanning) a vein pattern of a hand palm of the registrant as the registrant biological information d1. With this, the scanner 33 functions as the biological information input section 22.

The IC card reader/writer 34 is for reading information written (stored and saved) in the registrant card, and for writing information from the fraud registration preventing apparatus 11 in the IC card. The IC card reader/writer 34 functions as the registrant card inserting section 19.

The numeric keypad 35 is used for inputting numeric values of the instruction contents (password) of the registrant, and functions as the password input section 20.

The HDD 36 is for storing data. The memory 37 reads and writes data in the fraud registration preventing apparatus 11 at any time. The memory 37 comprises a RAM (random-access memory) in which data and a program are temporarily stored when the CPU 29 carries out computation processing, and a ROM (read-only memory) in which various programs and data used for computation processing of the CPU 29 are stored.

The display 38 shows various information sets concerning the fraud registration preventing apparatus 11. For example, the display 38 shows a log-in screen (not shown) which is referred to when an operator logs in, and a registration operation screen (not shown) which is referred to when the operator carries out the registration operation.

The managing server 28 manages the fraud registration preventing apparatus 11. The managing server 28 is a computer having a storage device 39, and is connected to the fraud registration preventing apparatus 11 through the network 42 such that the managing server 28 can communicate with the fraud registration preventing apparatus 11.

The storage device 39 is for storing information used in the fraud registration preventing apparatus 11. For example, the storage device 39 includes an operator DB (Database) which is a database for managing information concerning the operator, and a registrant DB which is a database for managing information concerning registrants. The storage device 39 in which the operator DB and the registrant DB are stored functions as the operator information storage section 13 and the registration section 12.

The computer (including the CPU, the information processing device and various terminals) may realize the functions of the collating section 16, the registration prohibiting section 17, the notifying section 18, the registrant authenticating section 21, the operator information extracting section 24 and the operator authenticating section 27 in the fraud registration preventing system 10 by executing a predetermined application program (fraud registration preventing program).

The program is recorded in a computer-readable recording medium such as a flexible disk or a CD (CD-ROM, CD-R, CD-RW or the like) or a DVD (DVD-ROM, DVD-RAM, DVD-R, DVD-RW, DVD+R, DVD+RW or the like) and is supplied. In this case, the computer reads the fraud registration preventing program from the recording medium, transfers the same to an internal storage device or an external storage device and stores the same. The program may be recorded in a storage device (recording medium) such as a magnetic disk, an optical disk, a magneto-optic disk or the like, and may be supplied to the computer from the storage device through a line of communication.

Here, the computer includes hardware and an OS, and means hardware which is operated under control of the OS. When the OS is not required and the hardware is operated only by an application program, the computer means the hardware itself. The hardware at least includes a microprocessor such as a CPU and means for reading a computer program recorded in a recording medium.

The application program as the fraud registration preventing program includes a program codes for allowing the computer to realize functions as the collating section 16, the registration prohibiting section 17, the notifying section 18, the registrant authenticating section 21, the operator information extracting section 24 and operator authenticating section 27 in the fraud registration preventing system 10. A portion of the function may be realized by the OS instead of the application program.

In addition to the above-described flexible disk, CD, DVD, magnetic disk, optical disk and magneto-optic disk, it is also possible to utilize, as the recording medium of the embodiment, various computer-readable media such as an IC card, a ROM cartridge, a magnetic tape, a punch card, an internal storage device (memory such as RAM and ROM) of the computer, an external storage device, and a printed matter on which a symbol such as a bar code is printed.

The present invention is not limited to the above-described embodiment, and can variously be modified in a range not departing from the subject matter of the invention and carried out.

Figure 5:
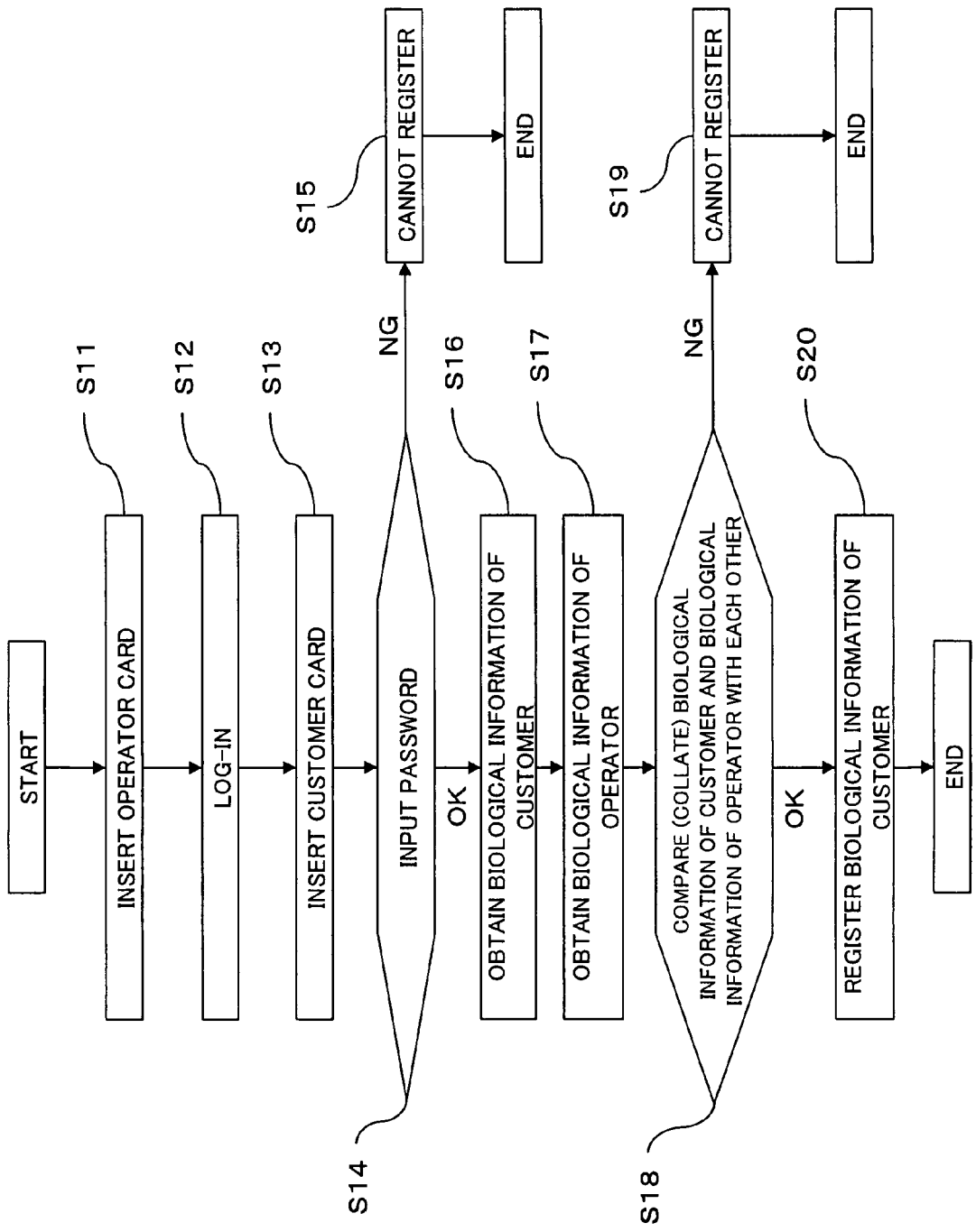
FIG. 5 is a flowchart used for explaining registration procedure of the registrant information in the fraud registration preventing system of the embodiment of the invention.

For example, although the fraud registration preventing system 10 has the registration section 12 and the operator information storage section 13 in the storage device 39 of the managing server 28 in the embodiment, the invention is not limited to this, and the fraud registration preventing apparatus 11 shown in FIG. 5 may include the registration section 12 and the operator information storage section 13 therein. For example, the registration section 12 and the operator information storage section 13 may be provided in the HDD 36 in the fraud registration preventing apparatus 11.

One of the registration section 12 and the operator information storage section 13 may be provided in the storage device 39 in the managing server 28, and the other one may be provided in the HDD 36 in the fraud registration preventing apparatus 11.

The registration section 12 and the operator information storage section 13 may be provided in an external storage device such as a memory of an IC card.

Although the registrant information obtaining section 14 includes the registrant card inserting section 19, the password input section 20, the registrant authenticating section 21 and the biological information input section 22 in the embodiment, the invention is not limited to this. Various existing techniques obtaining the registrant biological information d1 may be used.

Although the operator information obtaining section 15 includes the operator ID obtaining section 23 and the operator information extracting section 24 in the embodiment, the invention is not limited to this. Various existing techniques for obtaining the operator biological information d4 may be used. For example, the operator biological information d4 may previously be written in an operator card such as the IC card, and the operator biological information d4 may directly read and obtained from the operator card. The operator biological information d4 may be input when an operator carries out the registration operation. Although the operator card inserting section 25 is provided and an operator is identified using the operator card, but another information or device such as a log-in account may be used.

The collating section 16, the registration prohibiting section 17, the notifying section 18, the registrant authenticating section 21, the operator information extracting section 24 and the operator authenticating section 27 may be provided outside of the fraud registration preventing apparatus 11, e.g., may be provided in the managing server 28 shown in FIG. 6.

As the registrant biological information d1 and the operator biological information d4, other things other than a vein pattern of a hand palm may be used, and it is possible to use various biological information such as a fingerprint, a palm print, a finger shape, a palm shape, a voice, a retina, a iris, a face image, a dynamic signature, a blood vessel pattern and a key stroke. If the other biological information is used, it is possible to variously modify a fingerprint sensor and various scanner, and to implement the invention. Information other than the biological information may be used, and various existing techniques for specifying a registrant may be used.

What is claimed is:

1. A fraud registration preventing apparatus comprising:
a registrant information obtaining section obtaining registrant information of a registrant;
an operator information obtaining section obtaining operator information concerning an operator who carries out a registration operation of the registrant information obtained by the registrant information obtaining section;
a collating section collating the registrant information obtained by the registrant information obtaining section with the operator information obtained by the operator information obtaining section in order to determine whether the registrant information coincides with the operator information; and
a registration prohibiting section prohibiting registration of the registrant information when a collation result of the collating section shows coincidence or almost coincidence,
wherein the operator information obtaining section includes an operator ID obtaining section obtaining operator identifying information of the operator, and an operator information extracting section extracting the operator information based on the operator identifying information,
the collating section collates the registrant information obtained by the registrant information obtaining section with the operator information extracted by the operator information extracting section, and
the registrant information and the operator information are biological information.

2. The fraud registration preventing apparatus according to claim 1, further comprising a notifying section notifying the collation result when the collation result of the collating section shows coincidence or almost coincidence.

3. A fraud registration preventing method comprising:
a registrant information obtaining step of obtaining registrant information of a registrant;
an operator information obtaining step of obtaining operator information concerning an operator who carries out a registration operation of the registrant information obtained by the registrant information obtaining step;
a collating step of collating the registrant information obtained at the registrant information obtaining step with the operator information obtained at the operator information obtaining step in order to determine whether the registrant information coincides with the operator information; and
a registration prohibiting step of prohibiting registration of the registrant information when a collation result of the collating step shows coincidence or almost coincidence,
wherein the operator information obtaining step includes an operator ID obtaining step of obtaining operator identifying information of the operator, and an operator information extracting step of extracting the operator information based on the operator identifying information,
the collating step collates the registrant information obtained at the registrant information obtaining step with the operator information extracted at the operator information extracting step, and
the registrant information and the operator information are biological information.

4. The fraud registration preventing method according to claim 3, wherein the registrant information and the operator information are biological information.

5. The fraud registration preventing method according to claim 3, further comprising a notifying step of notifying the collation result when the collation result of the collating step shows coincidence or almost coincidence.

6. A computer-readable recording medium in which a fraud registration preventing program is stored, wherein the program makes a computer function as:
a registrant information obtaining section obtaining registrant information of a registrant;
an operator information obtaining section obtaining operator information concerning an operator who carries out a registration operation of the registrant information obtained by the registrant information obtaining section;
a collating section collating the registrant information obtained by the registrant information obtaining section with the operator information obtained by the operator information obtaining section in order to determine whether the registrant information coincides with the operator information; and
a registration prohibiting section prohibiting registration of the registrant information when a collation result of the collating section shows coincidence or almost coincidence,
wherein
when the program makes the computer function as the operator information obtaining section, the computer is made to function as an operator ID obtaining section obtaining operator identifying information of the operator, and an operator information extracting section extracting the operator information based on the operator identifying information,
when the program makes the computer function as the collating section, the computer is made to function so as to collate the registrant information obtained by the registrant information obtaining section and the operator information extracted by the operator information extracting section, and
the registrant information and the operator information are biological information.

7. The computer-readable recording medium in which the fraud registration preventing program according to claim 6 is recorded, wherein the registrant information and the operator information are biological information.

8. The computer-readable recording medium in which the fraud registration preventing program according to claim 6 is recorded, wherein the fraud registration preventing program makes the computer function as a notifying section notifying the collation result when the collation result of the collating section shows coincidence or almost coincidence.

9. A fraud registration preventing system comprising:
a registrant information obtaining section obtaining registrant information of a registrant;
a registration section in which the registrant information obtained by the registrant information obtaining section;
an operator information obtaining section obtaining operator information concerning an operator who carries out a registration operation of the registrant information obtained by the registrant information obtaining section with respect to the registration section;
a collating section collating the registrant information obtained by the registrant information obtaining section with the operator information obtained by the operator information obtaining section in order to determine whether the registrant information coincides with the operator information, and
a registration prohibiting section prohibiting registration of the registrant information to the registration section when a collation result of the collating section shows coincidence or almost coincidence, wherein
the operator information obtaining section includes an operator ID obtaining section obtaining operator identifying information of the operator and an operator information extracting section extracting the operator information from the operator information storage section based on the operator identifying information,
the collating section collates the registrant information obtained by the registrant information obtaining section and the operator information extracted by the operator information extracting section, and the registrant information and the operator information are biological information.

10. The fraud registration preventing system according to claim 9, wherein the registrant information and the operator information are biological information.

11. The fraud registration preventing system according to claim 9, further comprising a notifying section notifying the collation result when the collation result of the collating section shows coincidence or almost coincidence.

* * * * *